United States Patent
Kanamarlapudi et al.

(10) Patent No.: US 9,210,688 B2
(45) Date of Patent: Dec. 8, 2015

(54) ENHANCED TUNE-AWAY MECHANISM DURING SIGNALING PROCEDURE IN MULTIPLE SUBSCRIPTION COMMUNICATIONS

(71) Applicant: QUALCOMM Incorporated, San Diego, CA (US)

(72) Inventors: Sitaramanjaneyulu Kanamarlapudi, San Diego, CA (US); Ansah Ahmed Sheik, Eluru (IN); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/464,290

(22) Filed: Aug. 20, 2014

(65) Prior Publication Data
US 2015/0237597 A1    Aug. 20, 2015

Related U.S. Application Data

(60) Provisional application No. 61/941,039, filed on Feb. 18, 2014.

(51) Int. Cl.
| | |
|---|---|
| *H04W 68/00* | (2009.01) |
| *H04W 68/02* | (2009.01) |
| *H04W 48/02* | (2009.01) |

(52) U.S. Cl.
CPC .............. *H04W 68/02* (2013.01); *H04W 48/02* (2013.01); *H04W 68/005* (2013.01)

(58) Field of Classification Search
CPC ... H04W 68/00; H04W 68/02; H04W 76/048; H04W 88/02; H04W 88/06; H04W 52/0212; H04W 52/02; H04W 72/00; H04W 72/02; H04W 72/04; H04W 72/12; H04W 72/1215; H04W 36/06

USPC .......................... 455/458, 425, 550.1, 552.1
See application file for complete search history.

(56) References Cited

U.S. PATENT DOCUMENTS

| | | |
|---|---|---|
| 2012/0083263 A1 | 4/2012 | Kim et al. |
| 2013/0172023 A1* | 7/2013 | Chan et al. ................... 455/466 |

(Continued)

OTHER PUBLICATIONS

Ericsson: "Dual-SIM Dual-Standby UEs and their impact on the RAN", 3GPP Draft; R2-115375 Dual-SIM Dual-Standby UEs and Their Impact on the RAN, 3rd Generation Partnership project (3GPP), Mobile Competence Centre; 650, Route Des Lucioles; F-06921 Sophia-Antipolic Cedex; France, vol. RAN WG2, no. Zhuhai; Oct. 10, 2011, Oct. 3, 2011, XP050540879, pp. 1-3, [retrieved on Oct. 3, 2010].

(Continued)

*Primary Examiner* — Siu Lee
(74) *Attorney, Agent, or Firm* — Loza & Loza LLP

(57) ABSTRACT

In various aspects of the disclosure, an improved tune-away technique is utilized by a user equipment (UE) for wireless communication during a signaling procedure for a primary subscription with reduced impact on paging performance of one or more secondary subscriptions. The UE performs a signaling procedure including receiving at least one protocol data unit (PDU) of a signaling radio bearer (SRB) message from a first network associated with the first subscription. The UE further determines a message type of the SRB message based on the at least one received PDU. If the message type indicates that the SRB message includes a signaling non-critical message, the UE further performs a tune-away procedure to communicate with a second network associated with the second subscription, while the signaling procedure is ongoing.

28 Claims, 12 Drawing Sheets

(56) References Cited

U.S. PATENT DOCUMENTS

| | | |
|---|---|---|
| 2013/0210484 A1 | 8/2013 | Jeenagala et al. |
| 2013/0260761 A1* | 10/2013 | Walke et al. .................. 455/436 |
| 2013/0295920 A1* | 11/2013 | Viswanadham et al. ... 455/426.1 |
| 2013/0303181 A1 | 11/2013 | Rajurkar et al. |
| 2013/0303240 A1 | 11/2013 | Sanka et al. |
| 2013/0337792 A1* | 12/2013 | Vanghi .......................... 455/417 |

OTHER PUBLICATIONS

International Search Report and Written Opinon—PCT/US2015/016197—ISA/EPO—May 6, 2015.

* cited by examiner

ENHANCED TUNE-AWAY MECHANISM DURING SIGNALING PROCEDURE IN MULTIPLE SUBSCRIPTION COMMUNICATIONS

CROSS-REFERENCE TO RELATED APPLICATIONS

This application claims priority to and the benefit of U.S. provisional patent application No. 61/941,039 filed in the United States Patent Office on Feb. 18, 2014, the entire content of which is incorporated herein by reference.

TECHNICAL FIELD

The technology discussed below relates generally to wireless communication systems, and more particularly, to a mobile station equipped to operate with multiple subscriptions and tune-away methods between the subscriptions.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is a radio access network (RAN) defined as a part of the Universal Mobile Telecommunications System (UMTS), which is a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

Generally in UMTS networks, mobile communication devices are configured to use a Universal Integrated Circuit Card (UICC) (also commonly referred to as a SIM card) to store the subscriber's identity and information for security and authentication purposes. Some mobile communication devices have multi-SIM capability utilizing multiple UICCs. In multi-SIM applications, mobile communication devices can engage in calls or other services on two or more different subscriptions. These subscriptions might be on the same network or different networks.

As the demand for mobile broadband access continues to increase, research and development continue to advance mobile technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects of the disclosure, an improved tune-away technique is utilized by a user equipment for wireless communication during a signaling procedure for a primary subscription with reduced impact on paging performance of one or more secondary subscriptions.

In one aspect, the disclosure provides a method of wireless communication operable at a user equipment (UE). The UE includes a first subscriber identity module (SIM) associated with a first subscription and a second SIM associated with a second subscription. The UE performs a signaling procedure including receiving at least one protocol data unit (PDU) of a signaling radio bearer (SRB) message from a first network associated with the first subscription. The UE further determines a message type of the SRB message based on the at least one received PDU. If the message type indicates that the SRB message includes a signaling non-critical message, the UE further performs a tune-away procedure to communicate with a second network associated with the second subscription, while the signaling procedure is ongoing.

In one aspect, the disclosure provides a multi-SIM user equipment (UE) including a first subscriber identity module (SIM) associated with a first subscription and a second SIM associated with a second subscription. The multi-SIM UE includes means for performing a signaling procedure including receiving at least one protocol data unit (PDU) of a signaling radio bearer (SRB) message from a first network associated with the first subscription. The multi-SIM UE further includes means for determining a message type of the SRB message based on the at least one received PDU. The multi-SIM UE further includes means for if the message type indicates that the SRB message includes a signaling non-critical message, performing a tune-away procedure to communicate with a second network associated the second subscription, while the signaling procedure is ongoing.

In one aspect, the disclosure provides an apparatus for wireless communication. The apparatus includes a first subscriber module (SIM) associated with a first subscription, a second SIM associated with a second subscription, a first subscription component, a message processing component, and a tune-away control component. The first subscription component is configured to perform a signaling procedure including receiving at least one protocol data unit (PDU) of a signaling radio bearer (SRB) message from a first network associated with the first subscription. The message processing component is configured to determine a message type of the SRB message based on the at least one received PDU. The tune-away control component is configured to if the message type indicates that the SRB message includes a signaling non-critical message, perform a tune-away procedure to communicate with a second network associated with the second subscription, while the signaling procedure is ongoing.

In one aspect, the disclosure provides a computer-readable storage medium including code for causing a user equipment (UE) to perform a signaling procedure. The UE includes a first subscriber module (SIM) associated with a first subscription and a second SIM associated with a second subscription. The codes causes the UE to perform a signaling procedure including receiving at least one protocol data unit (PDU) of a signaling radio bearer (SRB) message from a first network associated with the first subscription. The code further causes the UE to determine a message type of the SRB message based on the at least one received PDU. The code further causes the UE to if the message type indicates that the SRB message includes a signaling non-critical message, perform a tune-away procedure to communicate with a second network associated with the second subscription, while the signaling procedure is ongoing.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
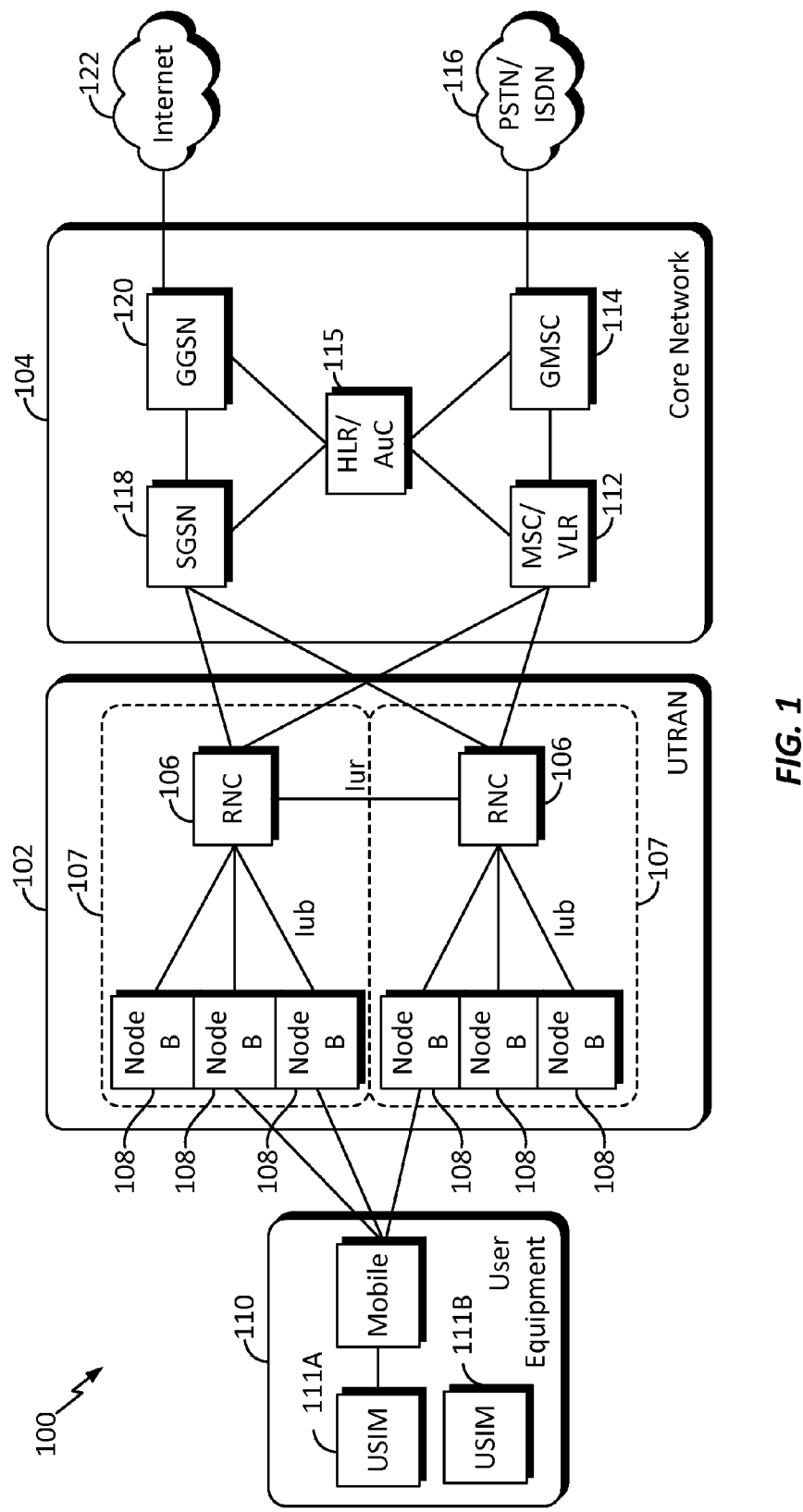
FIG. 1 is a block diagram illustrating an example of a telecommunications system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Some multi-SIM mobile communication devices utilize a shared transceiver or RF chain for multiple subscriptions. However, there are certain limitations on carrying communications simultaneously for multiple subscriptions using a shared transceiver or RF resource. One or more aspects of the disclosure provide a wireless user equipment (UE) configured to enable communication using two or more subscriptions simultaneously. Each subscription may be using the same or different radio access technologies (RAT). In some examples, the RAT may be W-CDMA, GSM, Long-Term Evolution (LTE), Wi-Fi, etc. The UE may have multiple universal subscriber identity module (USIM) applications stored on one or more UICCs (also referred to as smart cards, SIM cards, or SIMs). In some aspects of the disclosure, however, the USIM applications may be stored at the UE without using a UICC or SIM card (e.g., soft or virtual SIM models). A UE with multiple USIM applications may be referred to as a multi-SIM device or having multi-SIM functionality.

In some aspects of the disclosure, an improved tune-away technique is used with a multi-SIM UE during a signaling procedure for a primary subscription without impacting paging performance of one or more secondary subscriptions. In one aspect of the disclosure, the multi-SIM UE may skip a tune-away operation depending on whether or not a signaling radio bearer (SRB) signaling communication ongoing with the primary subscription involves signaling critical messages. In general, signaling critical messages refer to SRB messages that are vital for maintaining the signaling connection between a UE and a network. In one example, signaling critical messages may be SRB messages that need to meet the performance requirements for the SRB procedures in terms of (N1, N2) parameters specified in the 3GPP Technical Specification (TS) 25.331, RRC Protocol Specification, section 13.5, version 12.1.0, which is incorporated herein by reference.

By way of example and not limitation, signaling critical messages include a radio bearer reconfiguration message, a transport channel reconfiguration message, a physical channel reconfiguration message, an active set update message, or any SRB messages that are time critical. However, the present disclosure is not limited to these signaling critical messages, and other suitable signaling critical messages may be used. Signaling non-critical messages may include any SRB messages that are not signaling critical messages as described throughout this specification. In some examples, signaling non-critical messages may be measurement control messages or measurement report messages.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a UMTS network 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. A subscription may include one or more services that the UE 110 may receive from the network. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a USIM 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

In some aspects of the disclosure, the UE 110 may include a plurality of UICCs or SIM cards, each of which may run one or more universal subscriber identity module (USIM) applications. A USIM stores the subscriber's identity, and provides a user's subscription information to a network as well as performing other security and authentication roles. In one example, the illustrated UE 110 includes two USIMs 111A and 111B, but those of ordinary skill in the art will understand that this is illustrative in nature only, and a UE may include any suitable number of USIMs and UICCs. UEs such as the UE 110 having multiple USIMs can be referred to as multi-SIM or multiple standby devices, with one particular example with two USIMs being called Dual SIM Dual Standby (DSDS) device or dual-SIM device. In another example, a Triple SIM Triple Standby (TSTS) device has three USIMs allowing the UE to have three subscriptions. A DSDS device is capable of being in standby on two networks concurrently or simultaneously, where a transceiver or RF chain of the UE 110 is time-shared by two subscriptions on the respective networks. In this way, connections or calls may be established on either of the networks or subscriptions with a single DSDS device. In generally, a DSDS device can support an active call for only one subscription while the DSDS device is on standby for the other subscription. During standby, the DSDS device can receive, for example, paging information or other overhead information from one or more of the subscriptions.

As an illustrative example, the UE 110 is a DSDS device capable of maintaining communication for two subscriptions. Within the scope of the present disclosure, similar functionality may be achieved utilizing more than one radio access technology (RAT), wherein the UE simultaneously maintains two or more subscriptions on two or more different RATs. For example, such a UE may maintain one or more subscriptions on one or more of a GSM network, a UMTS network, an LTE network, a cdma2000 network, a Wi-MAX network, or any other suitable RAT. Within the present disclosure, DSDS devices, TSTS devices, multi-SIM or multiple standby devices, or any device capable of monitoring channels on two or more subscriptions on any one or any plural number of RATs, are generally referred to as a multi-SIM device in this specification.

On a multi-SIM UE 110, some compromises are typical to allow sharing of the radio transceiver or RF resource for two or more separate user subscriptions. That is, the UE 110 may not be listening to all of the radio channels for each subscription at the same time, and thus, may miss paging messages on one subscription when engaged in a communication activity utilizing the other subscription. Many cellular network implementations do allow for broadcast information (such as paging messages) to be repeated a finite number of times over multiple cycles, but do not provide an effective mechanism for the subscriber devices to know what this repetition pattern might be. Thus, there remains a possibility that such broadcast information for one subscription might be missed by a multi-SIM UE engaged in a communication activity for a different subscription or channel. When the numbers of subscriptions increase to three or even more, paging performance may be worse because less time will be available for monitoring the paging channels on each of the subscriptions using a tune-away procedure. During a tune-away procedure, the UE 110 reconfigures (e.g., retunes) its radio transceiver such that it can monitor channels from the secondary subscription while maintaining the connection with the primary subscription. However, performance of the primary subscription may be affected if the tune-away is overused. In other examples, the UE 110 may perform the tune-away procedure such that it can monitor channels for the primary subscription while performing a signaling procedure for the secondary subscription.

Figure 2:
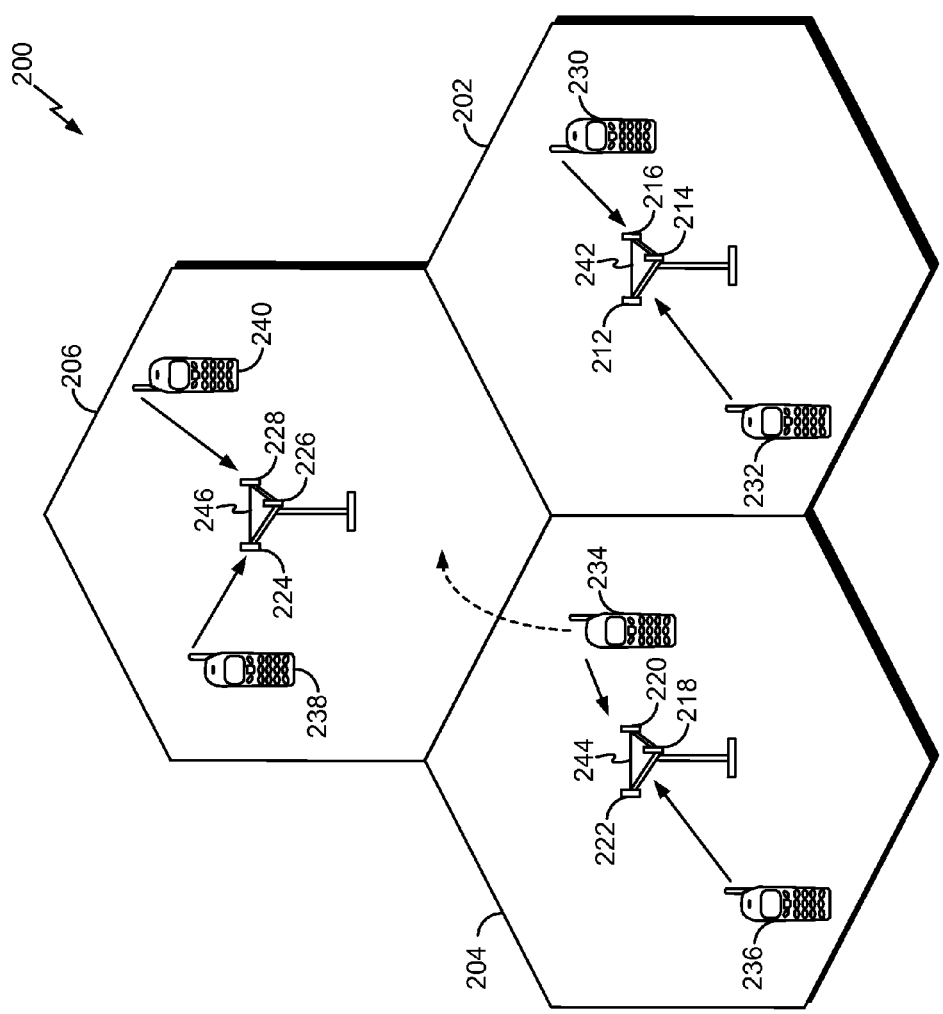
FIG. 2 is a diagram illustrating an example of an access network according to some aspects of the disclosure.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 104 (see FIG. 1) for all the UEs 230, 232, 234, 236, 238, and 240 in the respective cells 202, 204, and 206. Any of the UEs in FIG. 2 may be a multi-SIM UE.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 3:
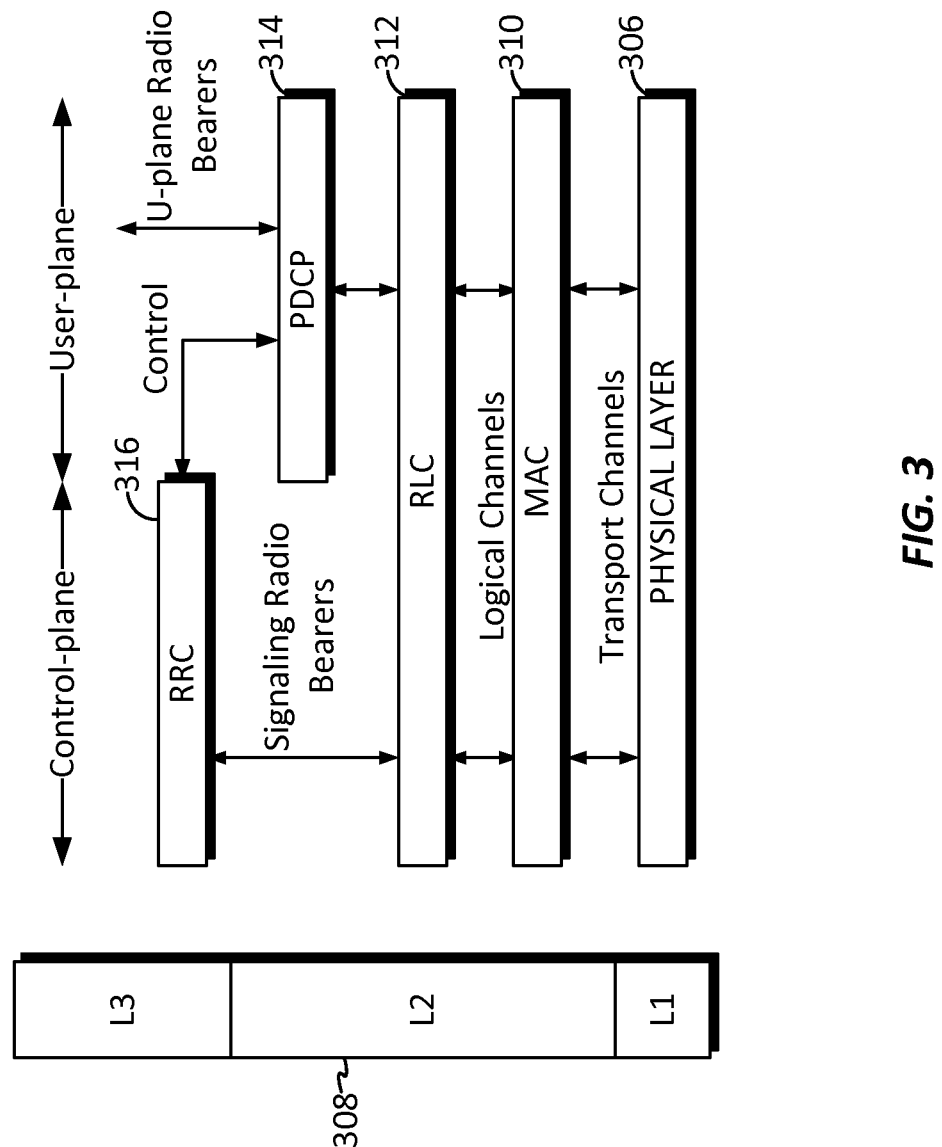
FIG. 3 is a diagram illustrating an example of a radio protocol architecture for the user and control plane.

Turning to FIG. 3, the AS is shown with three layers: Layer 1 (L1), Layer 2 (L2), and Layer 3 (L3). Layer 1 is the lowest layer and implements various physical layer signal processing functions. Layer 1 will be referred to herein as the physical layer 306. The data link layer, called Layer 2 308, is above the physical layer 306 and is responsible for the link between the UE 110 and Node B 108 over the physical layer 306.

At Layer 3, the radio resource control (RRC) layer 316 handles the control plane signaling between the UE 110 and the Node B 108. RRC layer 316 includes a number of functional entities for routing higher layer messages, handling broadcasting and paging functions, establishing and configuring radio bearers, etc. The RRC layer 316 may also perform a signaling procedure with a peer RRC entity of the network.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities. The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

A multi-SIM UE 110 can support multiple radio protocol architectures including the UMTS protocol architecture of FIG. 3 and other protocol architectures known in the art. In various aspects of the disclosure, the multi-SIM UE 110 can also support the radio protocol architecture of an LTE network, a cdma2000 network, a Wi-MAX network, or any other suitable RAT.

Figure 4:
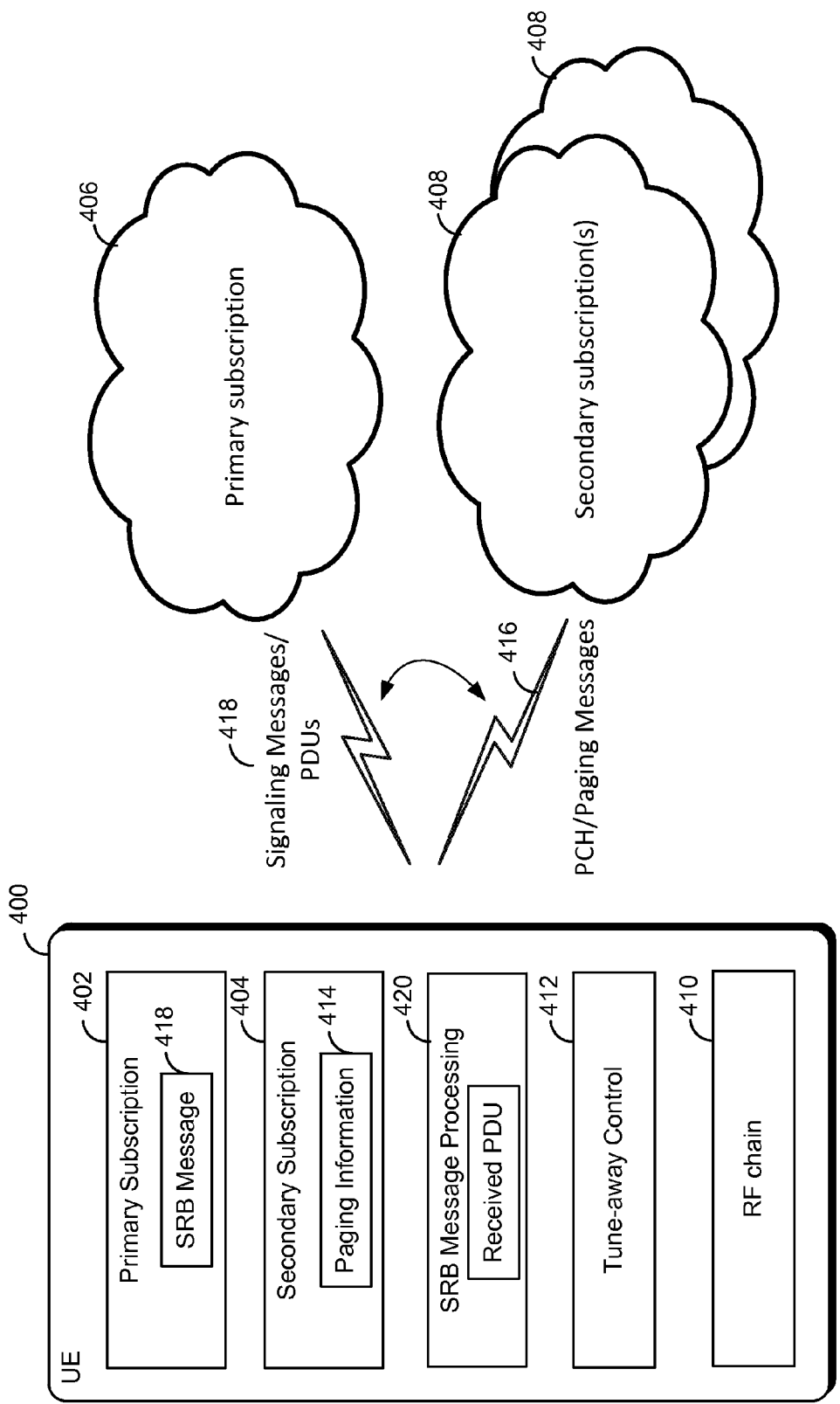
FIG. 4 is a diagram illustrating a multi-SIM user equipment (UE) configured for a primary subscription and one or more secondary subscriptions using a tune-away procedure according to some aspects of the disclosure.

FIG. 4 is a diagram illustrating a multi-SIM UE 400 capable of utilizing a primary subscription and one or more secondary subscriptions using a tune-away procedure, in accordance with an aspect of the disclosure. The UE 400 may be any of the UEs illustrated in FIGS. 1, 2, 5, 7, 8, and/or 12. The UE 400 includes a number of components or blocks that may be implemented in hardware, software, firmware, and/or a combination thereof. The UE 400 has a primary subscription block 402 (e.g., a first subscription component) and a secondary subscription block 404 (e.g., a second subscription component). The primary subscription block 402 is for communication with a first network 406 associated with a primary subscription. The secondary subscription block 404 is for communication with one or more second networks 408 associated with corresponding secondary subscriptions. The terms "primary" and "secondary" used in this context is for identification of the different subscriptions, but not implying any ranking or preference among the subscriptions.

In one aspect of the disclosure, the UE 400 can use the same radio frequency (RF) chain 410 to communicate with the first network 406 and second networks 408 using a suitable tune-away procedure. The UE 400 also includes a tune-away control block 412 (e.g., a tune-away control component), together with other blocks, for performing or controlling a tune-away procedure between the primary and secondary subscriptions. While the UE 400 is active (e.g., engaged in a voice or data call, or signaling procedure) for the primary subscription, the UE 400 may need to tune away to the secondary subscription at certain occasions. In one example, the UE 400 may need to tune away to the secondary subscription to receive paging messages, for example, the Paging Indicators (PIs) for a Mobile Terminated (MT) call of the second network 408. In one example, the UE 400 may monitor a Paging Channel (PCH) 416, which is always transmitted over the entire cell. The transmission of the PCH 416 is associated with the transmission of physical-layer generated Paging Indicators. This process of tuning-away from the primary subscription for reading the paging information on the secondary subscription is generally referred as tune-away (e.g., DSDS tune-away for a dual SIM UE or multi-SIM tune-away for a multi-SIM UE).

Figure 5:
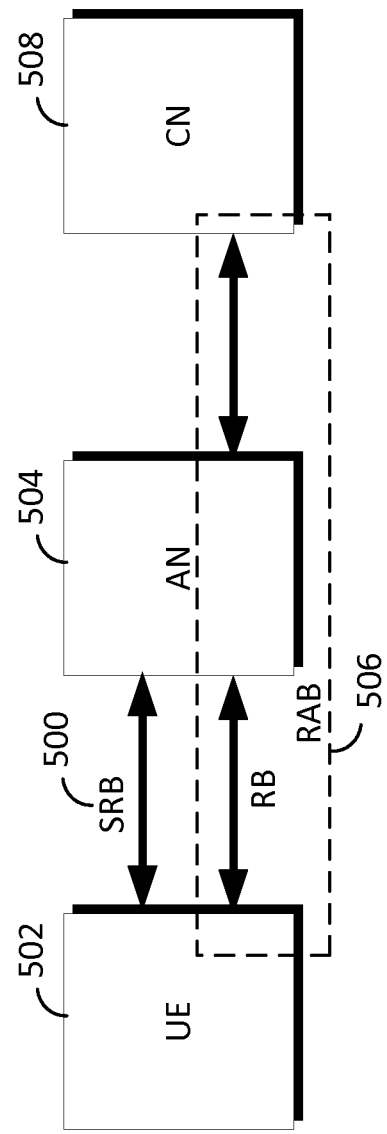
FIG. 5 is a diagram illustrating a Signaling Radio Bearer (SRB) established between a UE and an access network, and a Radio Access Bearer established between the UE and a core network.

If the UE 400 goes through the tune-away process while there is an ongoing signaling procedure for the primary subscription, it is possible that the UE 400 may miss the signaling messages or an associated Layer 2 acknowledgment (ACK) for the signaling messages of the primary subscription. For example, the signaling messages may include an SRB message 418 or data packets/PDUs carried on an SRB. The UE 400 may have an SRB message processing block 420 (e.g., a message processing component) that can process SRB messages or PDUs of the SRB messages. Referring to FIG. 5, an SRB 500 is established between a UE 502 and an access network (AN) 504, and a Radio Access Bearer (RAB) 506 is established between the UE 502 and a code network (CN) 508. The SRB 500 can be used to deliver SRB signaling messages, for example, to perform a handover, reconfiguration, release, etc. In one example, the UE 502 may be the same as the UE 400. Any failure of the signaling messages (e.g., SRB messages) is not desirable from the performance standpoint of the primary subscription. Also, any failure of signaling procedures might result in an undesirable call drop for the primary subscription.

During connection establishment, an RRC Connection Setup procedure establishes one or more SRBs. The SRBs are then used to send all subsequent signaling messages to start the desired service and establish the radio bearers (RBs) for the service. A procedure involving these exchanges of SRB messages is generally referred to as a signaling procedure. In some aspects of the disclosure, a signaling procedure refers to the information exchange concerning the establishment and control of communication between a UE and a network. Establishment of the radio bearers is achieved using a radio bearer (RB) Setup procedure. A major part of the control signaling between a UE and a UTRAN (or an access network) is RRC signaling. SRBs are used in the control plane for RRC signaling. RRC messages (SRB messages) carry the parameters used to set up, modify and release layer 2 and layer 1 protocol entities. RRC messages also carry in their payload higher layer signaling (e.g., mobility management (MM), connection management (CM), session management (SM), etc.). In addition, the mobility of a UE in the connected mode is controlled by RRC signaling (measurements, handovers, cell updates, etc.).

SRB messages are generally given higher priority in order to meet the performance requirements for the SRB procedures in terms of (N1, N2) parameters specified in the 3GPP Technical Specification (TS) 25.331, RRC Protocol Specification, section 13.5, version 12.1.0, which is incorporated herein by reference. To avoid or reduce performance degradation of SRB signaling for the primary subscription, a multi-SIM UE should avoid tune-away or relinquishing its RF resources (e.g., RF chain 410) so as to access the secondary subscriptions in certain conditions.

Figure 6:
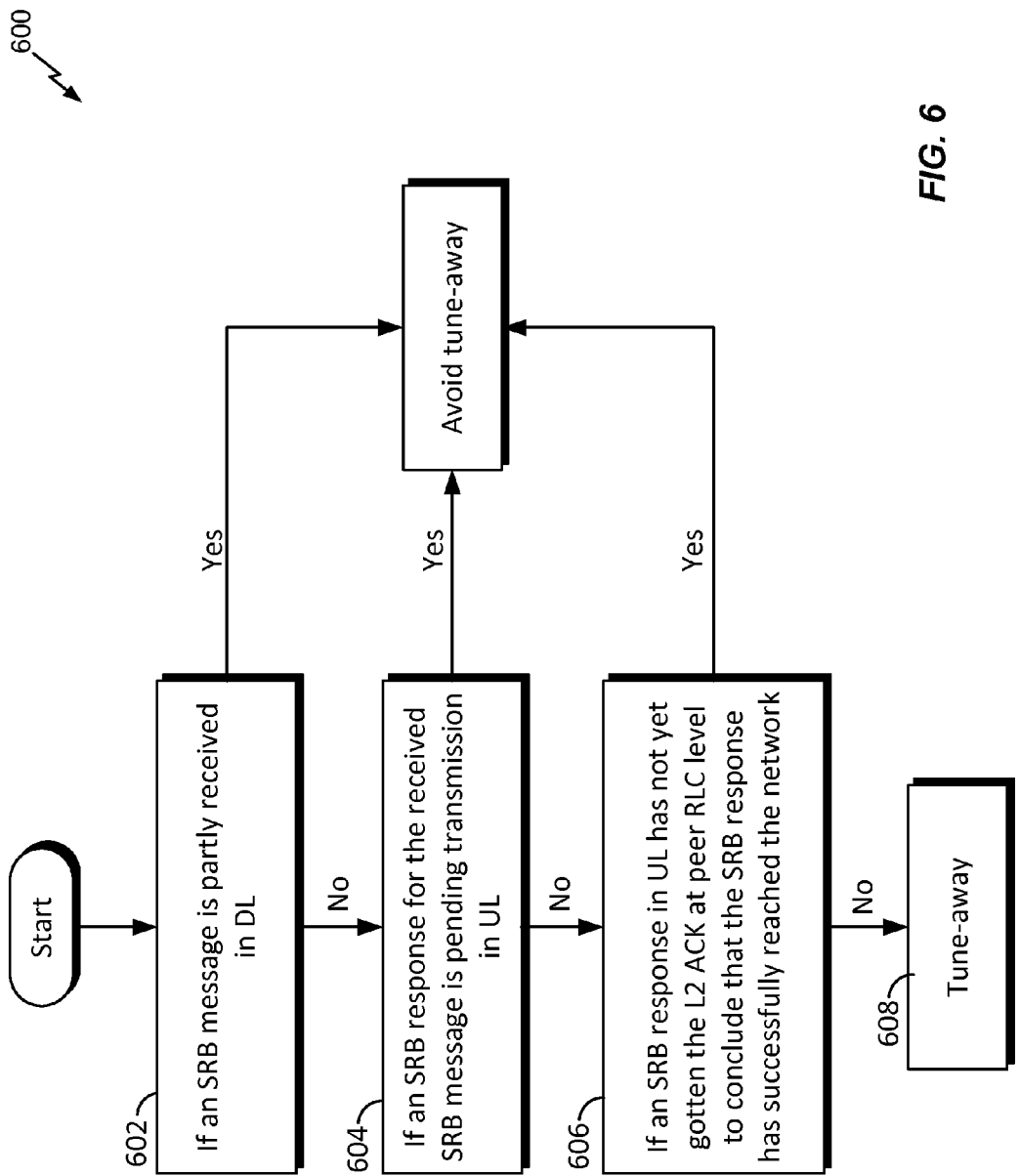
FIG. 6 is a diagram illustrating a method for performing a tune-away procedure during a signaling procedure according to an aspect of the disclosure.

FIG. 6 is a diagram illustrating a method 600 for performing tune-away during an SRB signaling procedure according to an aspect of the disclosure. In one example, the method 600 may be performed using any of the UEs illustrated in FIGS. 1, 2, 4, 5, 7, 8, and/or 12 such as the UE 400. At block 602, if an SRB message is partly received in the downlink (DL) of the primary subscription, the UE will avoid tune-away. For example, the SRB message may be an RRC Connection Reconfiguration message of which one or more PDUs have been received. At block 604, if an SRB response for a received SRB message is pending transmission in the uplink (UL), the UE will avoid tune-away. For example, the SRB response may be an RRC Connection Reconfiguration Complete message. At block 606, if the UE has not yet received an L2 acknowledgement (ACK) at the peer RLC level for an SRB response sent in the uplink, the UE will avoid tune-away. Otherwise, at block 608, the UE can tune away to the secondary subscription to receive paging messages. In some aspects of the disclosure, the UE may perform some or all of the operations of blocks 602, 604, and 606 in any suitable orders, not limited to the particular order illustrated in FIG. 6. In one aspect of the disclosure, the method 600 may be used when the SRB signaling procedure involves signaling critical messages.

With the growing number of SIMs in a UE (e.g., 3 or more SIMs), paging performance becomes very critical in addition to other subscription activities. In some cases, heavy network usage of some SRB messages, which are not vital or critical to maintaining the signaling connection for the primary subscription, may degrade paging performance and increase call drop on the secondary subscription. For example, the network may generate large amount of signaling non-critical messages such as Measurement Control and Measurement Report messages that can prevent the UE from performing tune-away according to the three conditions for avoiding tune-away of FIG. 6. Therefore, the UE will have less opportunity to receive paging messages from the other subscription using tune-away.

Figure 7:
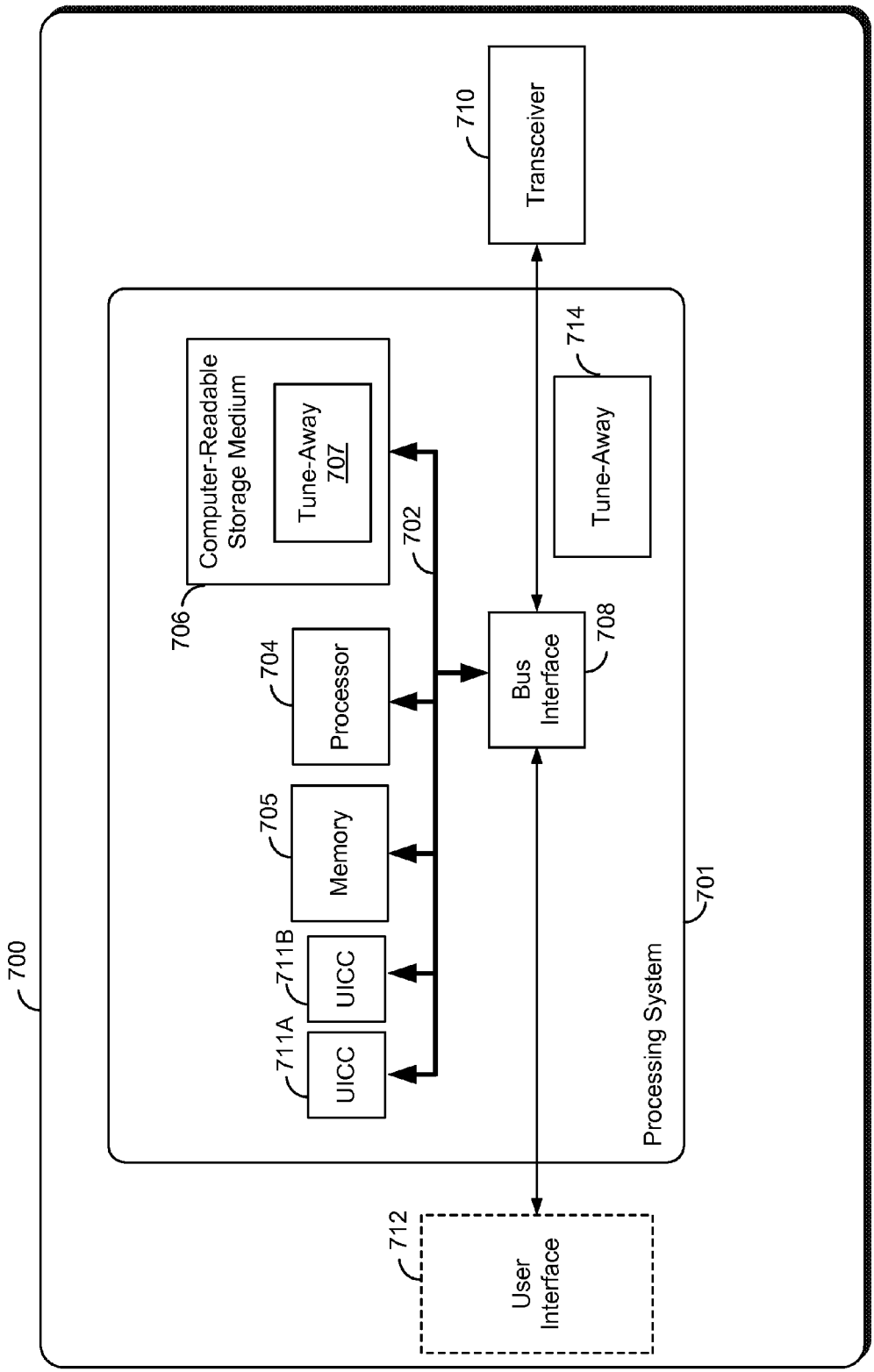
FIG. 7 is a block diagram illustrating an example of a hardware implementation for an apparatus employing a processing system according to some aspects of the disclosure.

FIG. 7 is a block diagram illustrating an example of a hardware implementation for an apparatus 700 employing a processing system 701. In accordance with various aspects of the disclosure, an element, or any portion of an element, or any combination of elements may be implemented with a processing system 701 that includes one or more processors 704. For example, in an aspect of the disclosure, the UEs of FIGS. 1, 2, 4, 5, 8, and/or 12 may be implemented with the apparatus 700. Examples of the processors 704 include microprocessors, microcontrollers, digital signal processors (DSPs), field programmable gate arrays (FPGAs), programmable logic devices (PLDs), state machines, gated logic, discrete hardware circuits, and other suitable hardware specifically configured to perform the various functions, methods, and procedures described throughout this disclosure.

In this example, the processing system 701 may be implemented with a bus architecture, represented generally by the bus 702. The bus 702 may include any number of interconnecting buses and bridges depending on the specific application of the processing system 701 and the overall design constraints. The bus 702 links together various circuits or components including one or more processors (represented generally by the processor 704), a memory 705, computer-readable media (represented generally by the computer-readable medium 706), a tune-away block 714, and one or more SIMs or UICCs 711A and 711B. Each UICC contains one or more USIM applications. The tune-away block 714 may include some or all of the blocks or components of the UE 400 of FIG. 4. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. For example, the transceiver 710 may be used to communicate with multiple networks associated with different subscriptions during a tune-away procedure described in FIGS. 6 and 8-12.

In some examples, even though each UICC (711A and 711B) may be associated with different subscriptions or networks, the UICCs can share a single transceiver 710 to communicate with the different subscriptions using a tune-away procedure. While the examples detailed herein relate to UEs that utilize a single transceiver 710 and methods for performing the below-described tune-away procedure utilizing a shared transceiver, the broad concepts described herein may also be applicable to devices having two or more transceivers or RF chains.

Depending upon the nature of the apparatus, a user interface 712 (e.g., keypad, display, speaker, microphone, joystick, touchscreen, touchpad) may also be provided. The processor 704 is responsible for managing the bus 702 and general processing, including the execution of software stored on the computer-readable medium 706. The software may include a tune-away software 707 that when executed for example by the processor 704 and/or tune-away block 714, causes the processing system 701 to perform the various functions described in FIGS. 6 and 8-12 for any particular apparatus. The computer-readable medium 706 may also be used for storing data that is manipulated by the processor 704 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 701, external to the processing system 701, or distributed across multiple entities including the processing system 701. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, a UE can simultaneously or concurrently perform two different communication activities, including but not limited to connecting with two different networks, two different subscriptions within the same network, or two cells in a cellular network. For example, the UE may be any of the UEs illustrated in FIGS. 1, 2, 4, 5, 7, 8, and/or 12. Particularly beneficial would be a UE enabled to continue to be engaged in ongoing communication activities (e.g., a signaling procedure) for one subscription, while simultaneously performing other communication activities for another subscription, such as receiving paging messages, performing SMS messaging, or receiving other information for a different subscription or from a different cell.

Figure 8:
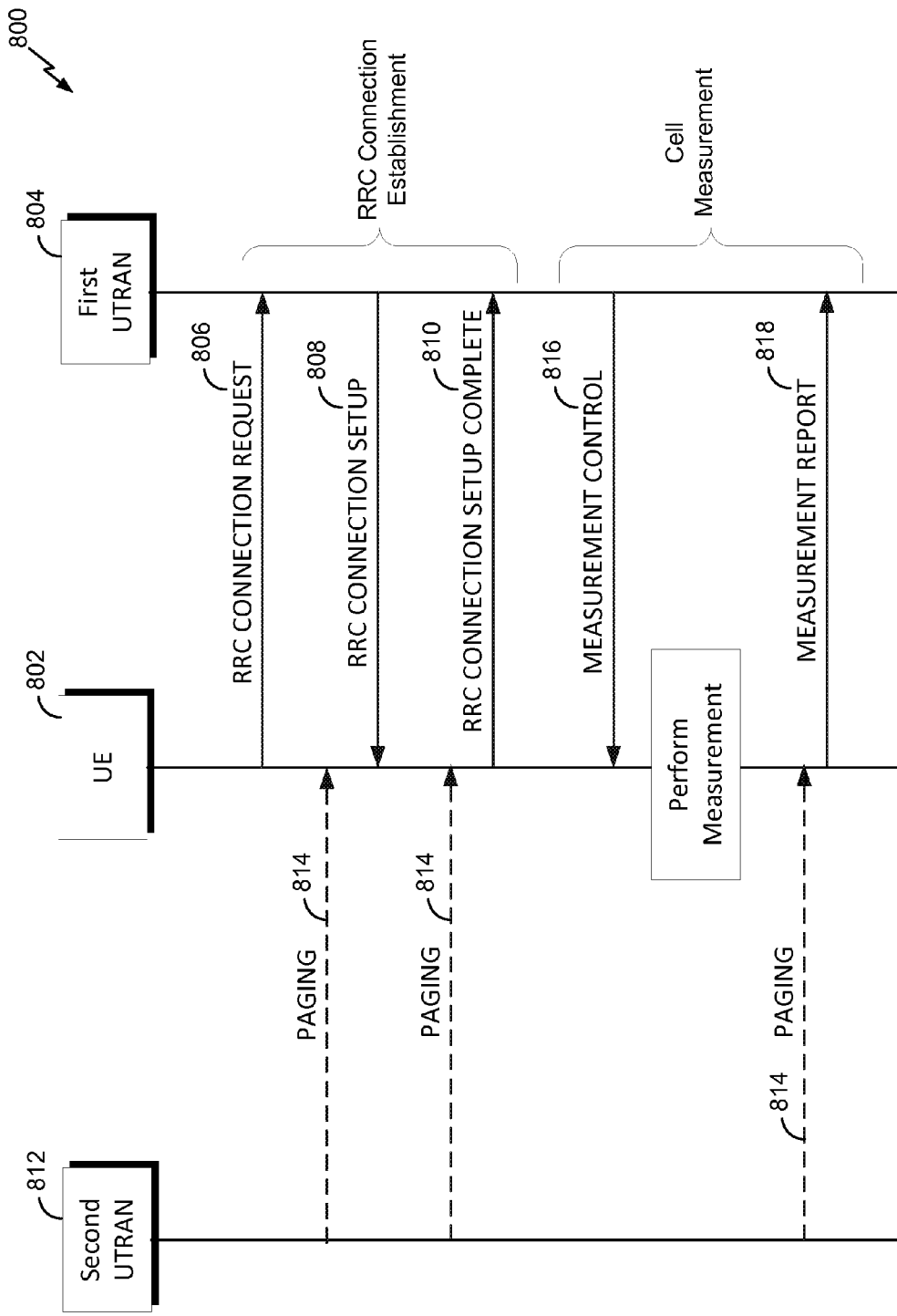
FIG. 8 is a message flow diagram illustrating a radio resource control (RRC) signaling procedure between a UE and two networks in accordance with some aspects of the disclosure.

FIG. 8 is a message flow diagram illustrating an RRC signaling procedure 800 between a UE 802 and a first UTRAN 804. In one aspect of the disclosure, the UE 802 may be any of the UEs illustrated in FIGS. 1, 2, 4, 5, 7, and/or 12, and the first UTRAN 804 may be associated with a primary subscription. In general, RRC signaling procedures involve various RRC messages including, for example, signaling message request/setup/setup complete and reconfigure/reconfigure complete. Referring to FIG. 8, in an RRC connection establishment procedure (a signaling procedure), the UE 802 transmits an RRC Connection Request message 806 to the first UTRAN 804, and the first UTRAN returns an RRC Connection Setup message 808 that contains configuration information for setting up an SRB (e.g., SRB 500 of FIG. 5). The RRC connection establishment procedure is one example of SRB signaling procedures. Then, the UE 802 transmits an RRC Connection Setup Complete message 810 that confirms the successful completion of the RRC connection establishment procedure.

When the RRC connection establishment procedure is ongoing, a second UTRAN 812 associated with a secondary subscription may send one or more paging messages 814 to the UE 802. However, a conventional UE would not tune away under certain conditions and may miss the paging messages. For example, in the conventional multi-SIM design, a UE is not allowed to tune away to the secondary subscription while the RRC connection establishment procedure is ongoing until a layer 2 RLC ACK is received by the UE for the RRC Connection Setup Complete message 810. Because these RRC message exchange procedures can span over a few hundreds of milliseconds, the number of paging message misses might be undesirably high for the other subscription and might result in degraded mobile terminated (MT) call performance on the secondary subscription. Furthermore, some signaling procedures do not have very specific time requirements; therefore, during heavy network loading conditions, the signaling procedures may take an undesirably long time to complete, thus resulting in more MT call performance degradation.

Some SRB signaling procedures are used for controlling cell measurements. For example, in a cell measurement signaling procedure, the first UTRAN 804 (e.g., an RNC) may send a Measurement Control message 816 to the UE 802. Based on the information of the Measurement Control message 816, the UE 802 performs the requested measurements and sends a Measurement Report message 818 back to the first UTRAN 804. A conventional UE may not tune away while the cell measurement signaling procedure is ongoing (i.e., not completed), and may miss a paging message 814 from the second UTRAN 812. Therefore, extensive usage of the measurement control and report messages for the primary subscription may block multiple paging occasions for the secondary subscription.

Thus, various aspects of the present disclosure provide for an improved tune-away procedure that can enhance multi-SIM performance of a UE, for example, in the above-described scenarios. That is, one or more aspects of the disclosure are directed to an improved tune-away scheme, such that the UE may tune away from a primary subscription to improve paging performance of one or more secondary subscriptions when certain signaling procedures involving signaling non-critical SRB messages are ongoing with the primary subscription. Non-limiting examples of signaling non-critical messages include the Measurement Control message 816 and Measurement Report message 818 of FIG. 8.

One aspect of the tune-away procedures disclosed herein lies in how it enables a UE to use a shared transceiver or RF resource to perform a tune-away procedure for two or more subscriptions in an efficient way, thus improving multi-SIM multi-standby performance. The UE may be any of the UEs illustrated in FIGS. 1, 2, 4, 5, 7, 8, and/or 12. To provide a straightforward understanding of various aspects of the disclosure, examples are provided below. As described below, a multi-SIM UE may periodically tune away from a primary subscription and receive paging messages from a secondary subscription with the same transceiver without substantially affecting an ongoing signaling procedure with the primary subscription. In an aspect of the disclosure, the UE skips or avoids tuning away from the primary subscription only if the ongoing SRB message(s) involved is a signaling critical message. Therefore, the UE can tune away to the secondary subscription more often to improve paging performance while a signaling procedure involving non-critical SRB messages is still ongoing for the primary subscription.

Figure 9:
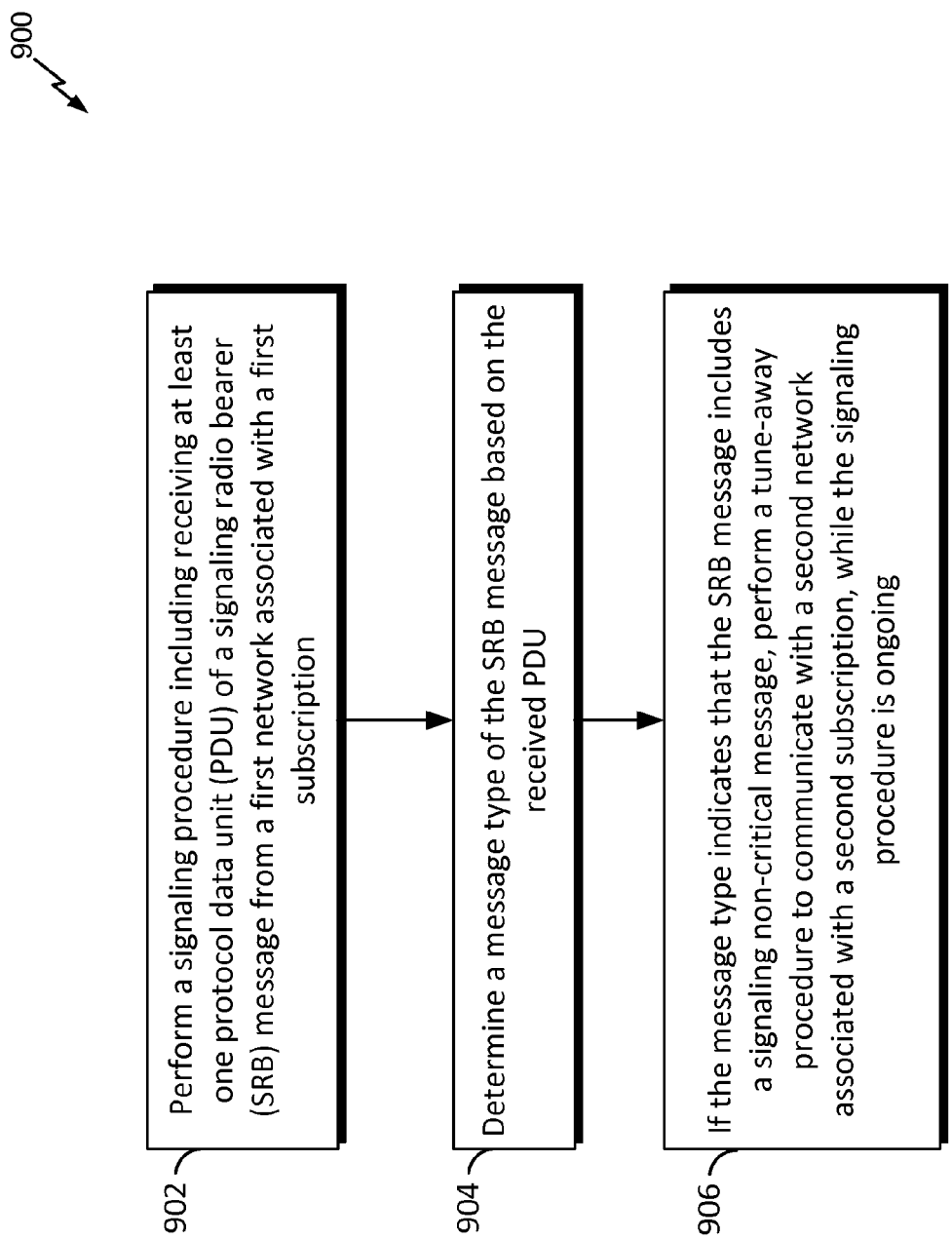
FIG. 9 is a flow chart illustrating a tune-away method operable at a multi-SIM UE in accordance with some aspects of the disclosure.

FIG. 9 is a diagram illustrating a tune-away method 900 operable at a multi-SIM UE in accordance with an aspect of the disclosure. In one example, the method 900 may be performed at any of the UEs illustrated in FIGS. 1, 2, 4, 5, 7, 8, and/or 12 such as the UE 400. At block 902, the UE 400 performs a signaling procedure for a first subscription. During the signaling procedure, the UE 400 receives at least one PDU of an SRB message from a first network 406 associated with the first subscription. For example, the UE 400 may utilize the primary subscription block 402 to perform the signaling procedure. In one example, the SRB message may be any of the RRC messages of FIG. 8. At block 904, the UE 400 determines a message type of the SRB message based on the received at least one PDU. The SRB message types are described in the 3GPP TS 25.331, Radio Resource Control (RRC); Protocol specification (Release 12), which is incorporated herein by reference. For example, some of the SRB message types defined in 3GPP TS 25.331 are illustrated in Table 1 below. For example, the UE 400 may utilize the SRB message processing block 420 to process the PDU in order to determine the type of the SRB message. At block 906, if the message type indicates that the SRB message includes a signaling non-critical message, the UE 400 can perform a tune-away procedure for a second network 408 associated with a second subscription, while the signaling procedure is ongoing for the first subscription. For example, the UE 400 may utilize the tune-away control block 412 to perform a tune away procedure to the second network 408 to receive data (e.g., paging messages) from the second network, while the SRB signaling procedure is still ongoing with the first network 406. However, if the message type indicates that the SRB message includes a signaling critical message, the UE 400 avoids tune-away while the signaling procedure involving such SRB message is ongoing (i.e., not completed).

By way of examples and not limitation, signaling critical SRB messages include a radio bearer reconfiguration message, a transport channel reconfiguration message, a physical channel reconfiguration message, an active set update message, a cell update message, a UTRAN registration area (URA) update message, etc. Some non-limiting examples of the signaling non-critical SRB messages include measurement control messages, measurement report messages, etc.

Figure 10:
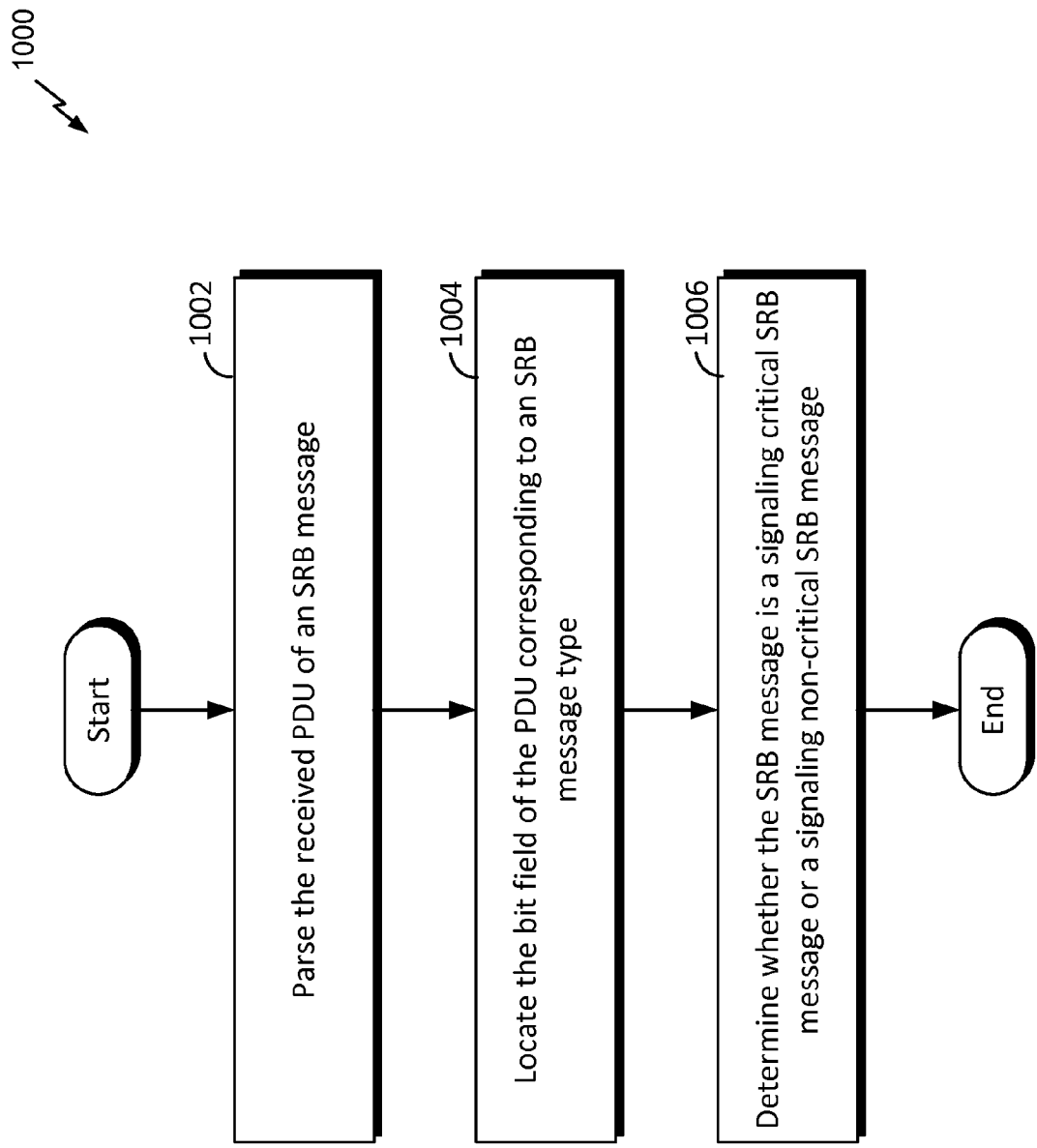
FIG. 10 is a flow chart illustrating a method for determining the type of an SRB message based on a protocol data unit in accordance with an aspect of the disclosure.

FIG. 10 is a flow chart illustrating a method 1000 for determining the type of an SRB message based on its PDU in accordance with an aspect of the disclosure. In one example, the method 1000 may be performed by any of the UEs illustrated in FIGS. 1, 2, 4, 5, 7, 8, and/or 12. For example, a UE 400 may utilize the SRB message processing block 420 of FIG. 4 to perform the method 1000. At block 1002, the UE 400 parses or analyzes the received one or more PDUs of an SRB message, which may include an Abstract Syntax Notation 1 (ASN.1) encoded RRC DL-DCCH-Message (Downlink Dedicated Control Channel (DCCH) message). See 3GPP TS 25.331 for more information. The RRC entity of the UE is aware of the fixed offset where the ASN.1 message type indication is present in the received PDU. With this information, at block 1004, the UE 400 locates the bit field of the PDU corresponding to the SRB message type. Then at block 1006, the UE 400 can determine whether the SRB message is a signaling critical SRB message or a signaling non-critical SRB message based on the SRB message type. For example, the RLC entity of the UE can check the received PDU message to determine what SRB message is being received and indicate this to the RRC entity. Some examples of the SRB message types are shown in Table 1 below.

TABLE 1

Figure 11:
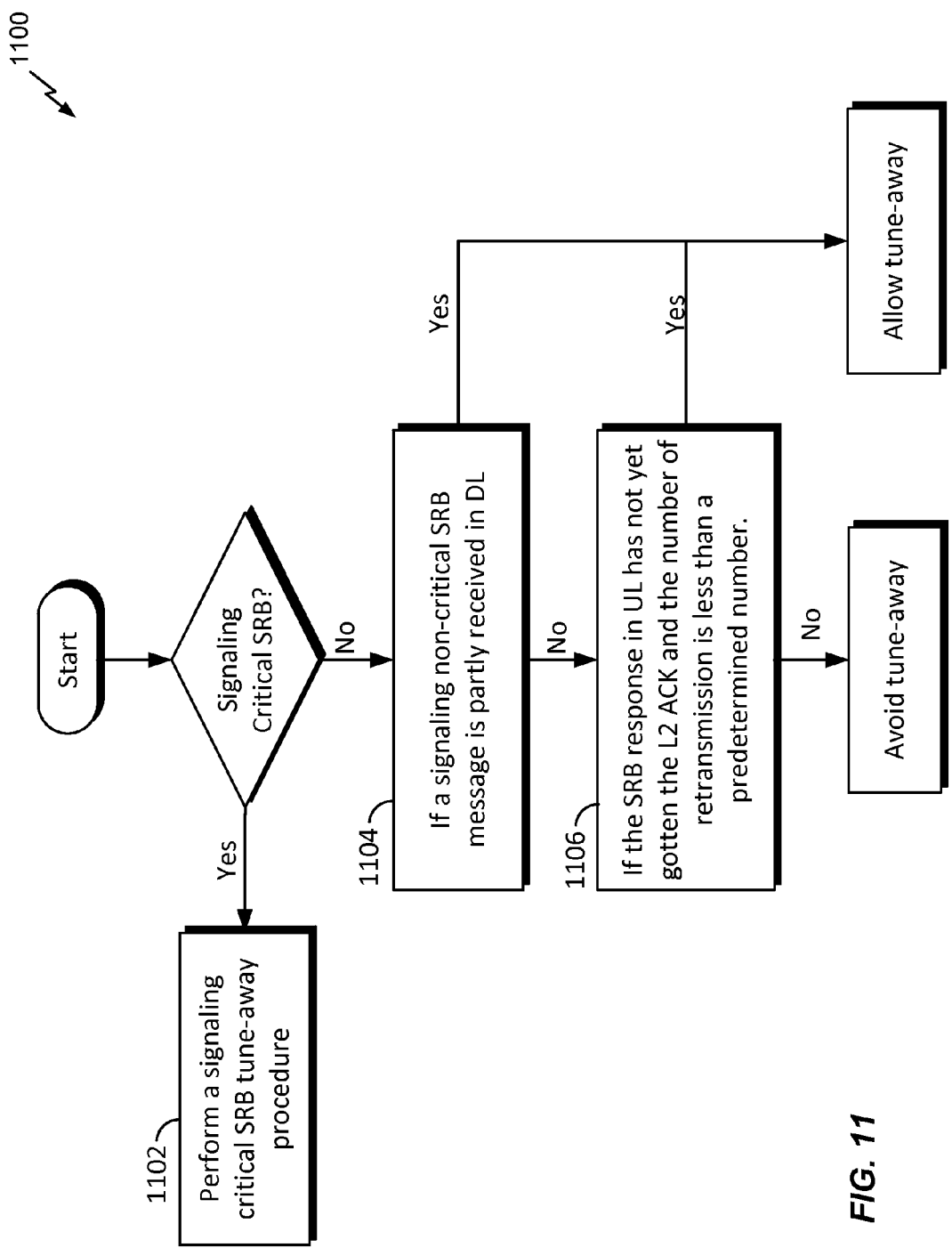
FIG. 11 is a flow chart illustrating a tune-away procedure operable at a multi-SIM UE in accordance with an aspect of the disclosure.
Figure 12:
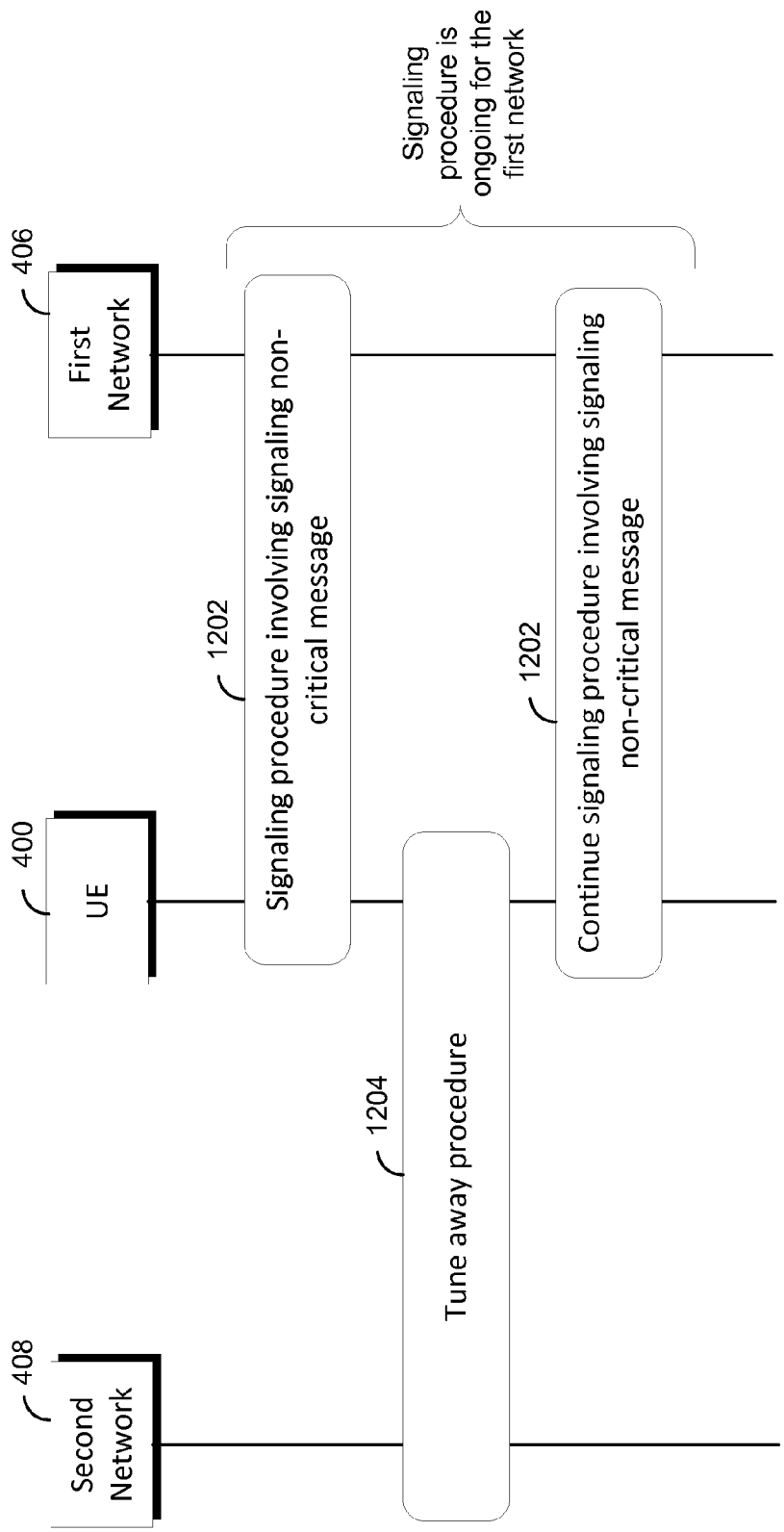
FIG. 12 is a diagram illustrating a signaling procedure involving a signaling non-critical SRB message in accordance with an aspect of the disclosure.

SRB Message Types in 3GPP TS 25.331 activeSetUpdate
assistanceDataDelivery
cellChangeOrderFromUTRAN
cellUpdateConfirm
counterCheck
downlinkDirectTransfer
handoverFromUTRANCommand-GSM
handoverFromUTRANCommand-CDMA2000
measurementControl
pagingType2
physicalChannelReconfiguration
physicalSharedChannelAllocation
radioBearerReconfiguration
radioBearerRelease
radioBearerSetup
rrcConnectionRelease
securityModeCommand
signallingConnectionRelease
transportChannelReconfiguration
transportFormatCombinationControl
ueCapabilityEnquiry
ueCapabilityInformationConfirm
uplinkPhysicalChannelControl
uraUpdateConfirm
utranMobilityInformation
handoverFromUTRANCommand-GERANIu
mbmsModifiedServicesInformation
etwsPrimaryNotificationWithSecurity
handoverFromUTRANCommand-EUTRA FIG. 11 is a flow chart illustrating a tune-away procedure 1100 operable at a multi-SIM UE in accordance with an aspect of the disclosure. In one example, the tune-away procedure 1100 may be performed by any of the UEs illustrated in FIGS. 1, 2, 4, 5, 7, 8, and/or 12 such as the UE 400. For example, the tune-away procedure 1100 may be performed at block 906 of FIG. 9. It is assumed that the UE 400 already received at least one PDU of an SRB message from a primary subscription, and the UE 400 can determine the type of the SRB message using for example the method 1000 of FIG. 10. If the SRB message is a signaling critical message, the procedure 1100 continues to block 1102; otherwise, the procedure continues to block 1104. At block 1102, the UE 400 may perform a signaling critical SRB tune-away procedure similar to the method 600 of FIG. 6 according to one example. Referring to FIG. 12, the UE 400 may be performing a signaling procedure 1202 involving a signaling non critical SRB message with a first network 406 associated with a primary subscription. If the SRB message is not a signaling critical message, the UE 400 may perform a tune-away procedure 1204 for a second network 408 associated with a secondary subscription in certain conditions while the SRB signaling procedure 1202 is still ongoing.

Referring back to FIG. 11, at block 1104, the UE 400 can tune away if a signaling non-critical SRB is partly received in the downlink (DL) for the primary subscription. At block 1106, the UE 400 can tune away if the SRB response sent in the uplink (UL) has not yet received an L2 ACK, and the number of retransmission of the L2 ACK is less than a predetermined number. For example, the predetermined number may be half of the maximum retransmission number, which may be determined by the network. Thus, the UE 400 will avoid tune-away if the number of retransmission of the L2 ACK is equal to or greater than the predetermined number.

Blocks 1104 and 1106 are only some examples of the improved tune-away procedure 1204, which may be applicable with other suitable signaling non-critical SRB messages. Furthermore, the sequence of execution of the various procedures, steps, and blocks of FIG. 11 may be modified in other aspects of the disclosure. According to the procedure 1100, a UE may improve paging performance with the secondary subscription without significantly impacting SRB signaling on the primary subscription.

Several aspects of a telecommunications system have been presented with reference to a UMTS system. As those skilled in the art will readily appreciate, various aspects described throughout this disclosure may be extended to other telecommunication systems, network architectures and communication standards.

By way of example, various aspects may be extended to systems employing UMTS (FDD, TDD), Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method of wireless communication operable at a user equipment (UE) comprising a first subscriber identity module (SIM) associated with a first subscription and a second SIM associated with a second subscription, comprising:

performing a signaling procedure comprising receiving at least one protocol data unit (PDU) of a signaling radio bearer (SRB) message from a first network associated with the first subscription;
determining a message type of the SRB message based on the at least one received PDU; and
if the message type indicates that the SRB message comprises a signaling non-critical message, performing a tune-away procedure to communicate with a second network associated with the second subscription, while the signaling procedure is ongoing.

2. The method of claim 1, wherein the signaling non-critical message comprises at least one of a measurement control message or a measurement report message.

3. The method of claim 1, wherein the tune-away procedure comprises:
tuning away to the second network to receive paging information from the second network.

4. The method of claim 1, wherein the tune-away procedure comprises:
if an acknowledgement for an SRB response of the SRB message has not been received from the first network and a number of retransmission of the acknowledgement is less than a predetermined value, tuning away to the second network to receive paging information from the second network.

5. The method of claim 1, further comprising:
if the SRB message comprises a signaling critical message, avoiding performing the tune-away procedure while the signaling procedure is ongoing.

6. The method of claim 5, wherein the signaling critical message comprises at least one of a radio bearer reconfiguration message, a transport channel reconfiguration message, a physical channel reconfiguration message, an active set update message, a cell update message, or a registration area update message.

7. The method of claim 1, wherein determining the message type of the SRB message comprises:
parsing the at least one PDU of the SRB message; and
locating a bit field of the at least one PDU corresponding to the message type of the SRB message.

8. A multi-SIM user equipment (UE) comprising a first subscriber identity module (SIM) associated with a first subscription and a second SIM associated with a second subscription, comprising:
means for performing a signaling procedure comprising receiving at least one protocol data unit (PDU) of a signaling radio bearer (SRB) message from a first network associated with the first subscription;
means for determining a message type of the SRB message based on the at least one received PDU; and
means for if the message type indicates that the SRB message comprises a signaling non-critical message, performing a tune-away procedure to communicate with a second network associated the second subscription, while the signaling procedure is ongoing.

9. The multi-SIM UE of claim 8, wherein the signaling non-critical message comprises at least one of a measurement control message or a measurement report message.

10. The multi-SIM UE of claim 8, wherein the tune-away procedure comprises:
tuning away to the second network to receive paging information from the second network.

11. The multi-SIM UE of claim 8, wherein the tune-away procedure comprises:
if an acknowledgement for an SRB response of the SRB message has not been received from the first network and a number of retransmission of the acknowledgement is less than a predetermined value, tuning away to the second network to receive paging information from the second network.

12. The multi-SIM UE of claim 8, further comprising:
means for if the SRB message comprises a signaling critical message, avoiding performing the tune-away procedure while the signaling procedure is ongoing.

13. The multi-SIM UE of claim 12, wherein the signaling critical message comprises at least one of a radio bearer reconfiguration message, a transport channel reconfiguration message, a physical channel reconfiguration message, an active set update message, a cell update message, or a registration area update message.

14. The multi-SIM UE of claim 8, wherein the means for determining the message type of the SRB message is configured to:
parse the at least one PDU of the SRB message; and
locate a bit field of the at least one PDU corresponding to the message type of the SRB message.

15. An apparatus for wireless communication, comprising:
a first subscriber module (SIM) associated with a first subscription;
a second SIM associated with a second subscription;
a first subscription component configured to perform a signaling procedure comprising receiving at least one protocol data unit (PDU) of a signaling radio bearer (SRB) message from a first network associated with the first subscription;
a message processing component configured to determine a message type of the SRB message based on the at least one received PDU; and
a tune-away control component configured to if the message type indicates that the SRB message comprises a signaling non-critical message, perform a tune-away procedure to communicate with a second network associated with the second subscription, while the signaling procedure is ongoing.

16. The apparatus of claim 15, wherein the signaling non-critical message comprises at least one of a measurement control message or a measurement report message.

17. The apparatus of claim 15, further comprising a second subscription component configured to receive paging information from the second network during the tune-away procedure.

18. The apparatus of claim 15, further comprising a second subscription component configured to if an acknowledgement for an SRB response of the SRB message has not been received from the first network and a number of retransmission of the acknowledgement is less than a predetermined value, receive paging information from the second network during the tune-away procedure.

19. The apparatus of claim 15, wherein the tune-away control component is further configured to:
if the SRB message comprises a signaling critical message, avoid performing the tune-away procedure while the signaling procedure is ongoing.

20. The apparatus of claim 19, wherein the signaling critical message comprises at least one of a radio bearer reconfiguration message, a transport channel reconfiguration message, a physical channel reconfiguration message, an active set update message, a cell update message, or a registration area update message.

21. The apparatus of claim 15, wherein the message processing component is further configured to:
  parse the at least one PDU of the SRB message; and
  locate a bit field of the at least one PDU corresponding to the message type of the SRB message.

22. A non-transitory computer-readable storage medium comprising code for causing a user equipment (UE) comprising a first subscriber module (SIM) associated with a first subscription and a second SIM associated with a second subscription, to:
  perform a signaling procedure comprising receiving at least one protocol data unit (PDU) of a signaling radio bearer (SRB) message from a first network associated with the first subscription;
  determine a message type of the SRB message based on the at least one received PDU; and
  if the message type indicates that the SRB message comprises a signaling non-critical message, perform a tune-away procedure to communicate with a second network associated with the second subscription, while the signaling procedure is ongoing.

23. The non-transitory computer-readable storage medium of claim 22, wherein the signaling non-critical message comprises at least one of a measurement control message or a measurement report message.

24. The non-transitory computer-readable storage medium of claim 22, wherein the tune-away procedure comprises:
  tuning away to the second network to receive paging information from the second network.

25. The non-transitory computer-readable storage medium of claim 22, wherein the tune-away procedure comprises:
  if an acknowledgement for an SRB response of the SRB message has not been received from the first network and a number of retransmission of the acknowledgement is less than a predetermined value, tuning away to the second network to receive paging information from the second network.

26. The non-transitory computer-readable storage medium of claim 22, wherein the code further causes the UE to:
  if the SRB message comprises a signaling critical message, avoid performing the tune-away procedure while the signaling procedure is ongoing.

27. The non-transitory computer-readable storage medium of claim 26, wherein the signaling critical message comprises at least one of a radio bearer reconfiguration message, a transport channel reconfiguration message, a physical channel reconfiguration message, an active set update message, a cell update message, or a registration area update message.

28. The non-transitory computer-readable storage medium of claim 22, wherein the code further causes the UE to:
  parse the at least one PDU of the SRB message; and
  locate a bit field of the at least one PDU corresponding to the message type of the SRB message.

\* \* \* \* \*